Patented Feb. 20, 1934

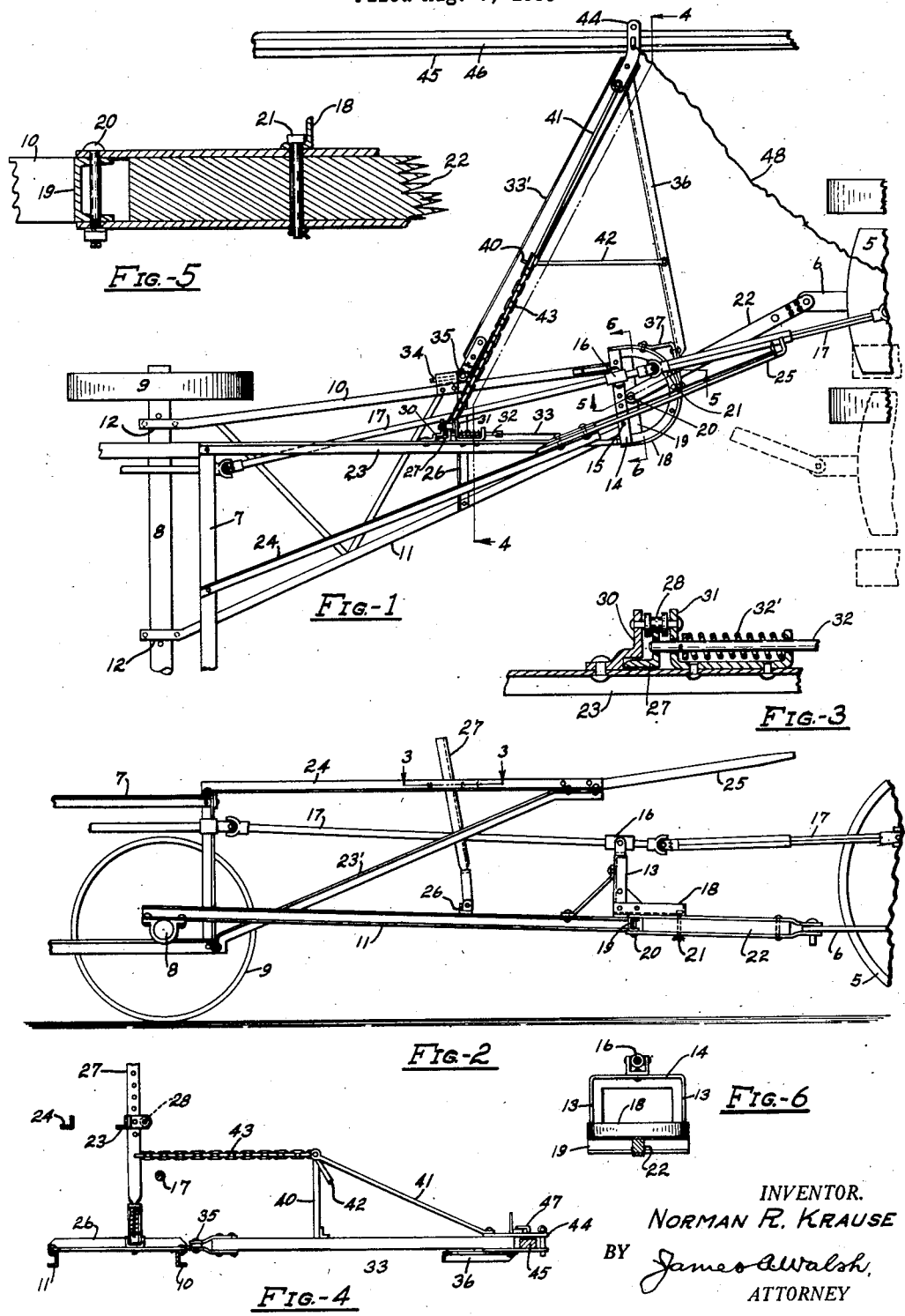

1,947,556

UNITED STATES PATENT OFFICE 1,947,556

CORN HARVESTING MACHINE

Norman R. Krause, Racine, Wis., assignor to J. I. Case Company, Racine, Wis., a corporation Application August 5, 1933. Serial No. 683,790

6 Claims. (Cl. 56—15)

My invention relates to an improved combination drawbar and wagon hitch of the character disclosed in my co-pending application Serial No. 630,818, filed August 29, 1932, now Patent No. 1,922,376, granted August 15, 1933, and is especially adapted for use in connection with tractor-drawn implements, such as corn harvesting machines, whereby when the tractor is steered laterally the implement and the vehicle usually drawn thereby will be unaffected by its movements and will remain in constant relation without swinging laterally, the assemblage of the drawbar and its connection with the implement and the tractor being such that when the tractor is swung inwardly and the hitch released from the vehicle and vertically adjusted on the drawbar, the latter, the tractor and the drawbar, will be so aligned that the combined elements will be sufficiently compacted as to freely pass through gateways and narrow passages, which is an advantage in transporting cumbersome harvesting machines requiring in many instances removal of more or less equipment to permit passage through limited space.

In the accompanying drawing, forming part hereof, Figure 1 is a plan view of a drawbar embodying my improvements; Fig. 2, a side elevation; Fig. 3, a detail section taken on the dotted line 3—3 in Fig. 2; Fig. 4, a detail section taken on the dotted line 4—4 in Fig. 1; Fig. 5 is a detail section taken on the dotted line 5—5 in Fig. 1, and Fig. 6 is a detail section taken on the dotted line 6—6 in Fig. 1.

In the drawing the numeral 5 indicates a tractor having a drawbar 6, and 7 is an implement of any character having an axle 8, and carrying wheels, as 9, of desired construction.

My improved drawbar comprises the beams 10, 11, pivotally mounted at 12 on the axle 8 to rock so that the implement may be adjusted in vertical directions.

The beams 10, 11, at their forward ends are connected to a U-shaped seat 13, the horizontal portion 14 thereof being apertured at 15 to receive a steady bearing 16 for a power take-off shaft 17 connected to the tractor and to the implement for actuating the mechanisms of the latter. To the lower end of the seat legs 13 an apertured segmental support 18 is secured, a shelf 19 being connected thereto for pivotally supporting, at 20, a draft-tongue 22 which at its forward end is pivotally connected to the tractor drawbar 6. To the frame 7, and forming part thereof, braces 23, 24, are secured and which convergingly extend forwardly over the drawbar, being reinforced by inclined braces, as 23', said braces 23, 24, having a lever 25 secured thereto for vertically adjusting the machine independently of the drawbar. A cross-member 26 braces the draft beams 10, 11, and upon which a quadrant 27 is yieldingly mounted to slide against a roller 28 held between brackets 30, 31, on the brace 23, said roller and brackets forming a guide for the quadrant, which latter is provided with holes for receiving a latch-pin 32 yieldingly mounted in the bracket 31, and which is adjustably connected to the lever, at 33.

A hitch-bar 33' is hingedly connected at 34 to the draft beam 10 to swing vertically, and is also pivoted to the beam at 35 to swing horizontally, thus having a dual hinge connection for adjustability when necessary. At its opposite end the hitch-bar is pivotally connected by a brace 36 to a keeper 37 attached to the segmental support 18, the brace being pivotally secured to swing vertically. A standard 40 is mounted on the hitch-bar and connected to the outer end thereof by a guide rod 41, as well as to the brace 36 by a cross rod 42, and which standard is also connected to the quadrant 27 by a chain 43 for sustaining the hitch-bar carrying a clevis 44 at its outer end in which a wagon tongue 45 and hitch-rod 46 are detachably secured, as disclosed in my aforesaid application.

In the use of my improved drawbar and wagon hitch it will be understood that the normal position of the drawbar 10, 11, is that shown in Fig. 1, the outer side of the seat 13 and associated supporting structure being substantially in alignment with the implement wheel. If it is desired to offset the tractor in relation to the implement, as indicated in full lines, the draft-tongue 22 is locked to the segmental support 18 by the pin 21, which maintains the draft-tongue in relation to the tractor drawbar as shown in full lines, Fig. 1. However, if conditions are such that substantially direct alignment of the tractor and implement are desirable, the draft-tongue 22 is released and the tractor steered to the dotted line position, Fig. 1, shifting the draft-tongue accordingly, in which position it may be secured by said pin 21, and as the segmental support embodies a series of holes it will be understood that the tractor and draft-tongue may be adjusted to various positions; and when thus changing the relation of the tractor to the implement the power shaft 17 is also adjusted correspondingly by changing the position of the steady bearing 16 on the seat portion 14. The brace 23 and quadrant 27 are normally held in engagement by the latch-pin 32 controlled by the spring 32' to automatically engage the quadrant, which is provided with a series of holes for the purpose, and when adjusting the implement vertically by manipulating lever 25, the latch-pin 32, adjustably connected to the lever at 33, is withdrawn from such engagement so that the lever will freely travel in vertical directions along the quadrant, the roller 28 riding along a web of the angle-bar quadrant to relieve any binding effect which might otherwise occur between the brackets 30, 31, and the quadrant. When the hitch-bar as described is swung out into working position as indicated in Fig. 1, and suspended from the quadrant, it will be understood that the quadrant being braced between brackets 30, 31, and the roller 28, provides a stable brace supported by the lever and drawbar members for effectively sustaining the hitch against strain of the wagon tongue secured in the clevis 44 and unsupported at its free end, the hitch and tongue being secured by a latch 47 in the clevis controlled by flexible means 48 within reach of the tractorman.

In the manner described I provide a well balanced combined drawbar and wagon hitch for agricultural machines, the drawbar element of which is so connected to a tractor that it is only necessary to steer the tractor laterally when changing the line of draft, without disconnecting or disturbing the drawbar in its relation to the implement to which it is attached, the hitch being hingedly connected to and supported thereby to be readily adjusted into and out of working position.

I claim as my invention

1. In a machine of the class described, a frame, a vertically adjustable drawbar connected to the frame, a quadrant yieldingly mounted on the frame, a guide roller on the frame in which the quadrant travels when vertically adjusted, a lever connected to the frame and adapted to engage the quadrant, a wagon hitch mounted on the drawbar, and means connecting the quadrant and hitch for sustaining the latter in normal position and also when said lever is vertically adjusted.

2. In a machine of the class described, a frame, a drawbar connected to the frame, a seat connecting the forward ends of the drawbar members, a draft-tongue adapted to be connected to a tractor, a shelf to which the tongue is pivotally connected, means for securing the tongue in laterally adjusted position, a quadrant on the drawbar, a wagon hitch pivotally connected to the drawbar, and flexible means connecting the quadrant and the hitch for sustaining the latter.

3. In a machine of the class described, a frame, a drawbar connected to the frame, means connecting the forward ends of the drawbar members, a draft-tongue adapted at one end to be connected to a tractor, means for pivotally connecting the opposite end of the draft-tongue, means for securing said tongue in laterally adjustable position, a quadrant on the drawbar, a hitch mounted on the drawbar, and means connecting the quadrant and hitch for sustaining the latter.

4. In a machine of the class described, a wheeled frame, a drawbar connected to the frame, a quadrant on the drawbar, a lever on the frame for vertically adjusting the machine, means associated with the lever and engageable with the quadrant for maintaining the lever in fixed position, a hitch bar pivotally mounted on the drawbar, a standard on the hitch bar, and flexible means connecting the standard and the quadrant for sustaining the hitch bar.

5. In a machine of the class described, a wheeled frame, a standard connected to the frame, a drawbar connected to the frame, a quadrant on the drawbar, an apertured seat connecting the forward ends of the drawbar members, a steady bearing adjustably mounted on the seat and adapted to receive a power shaft, a segmental support connected to the seat, a shelf associated with the support, a draft-tongue pivotally connected to the shelf, means for securing the draft-tongue in adjusted position in relation to the segmental support, a wagon hitch pivotally connected to the support, and flexible means connecting the quadrant and hitch for sustaining the latter.

6. In a machine of the class described, a wheeled frame, a drawbar connected to the frame, a lever on the frame for adjusting the machine vertically, brackets on the frame, a latch pin mounted in one of the brackets and connected to the lever, a quadrant on the drawbar passing between the brackets, a wagon hitch pivotally mounted on the drawbar, and means connecting the quadrant and hitch for sustaining the latter.

NORMAN R. KRAUSE.